(12) United States Patent
Annavajjala et al.

(10) Patent No.: US 8,428,008 B2
(45) Date of Patent: Apr. 23, 2013

(54) IMPLICIT CHANNEL SOUNDING FOR CLOSED-LOOP TRANSMISSION IN MIMO-OFDM WIRELESS NETWORKS

(75) Inventors: Ramesh Annavajjala, Quincy, MA (US); Philip Orlik, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 356 days.

(21) Appl. No.: 12/940,465

(22) Filed: Nov. 5, 2010

(65) Prior Publication Data
US 2012/0002599 A1 Jan. 5, 2012

Related U.S. Application Data (63) Continuation-in-part of application No. 12/827,591, filed on Jun. 30, 2010, now Pat. No. 8,284,862.

(51) Int. Cl.
H04W 4/00 (2009.01)
H04B 7/208 (2006.01)

(52) U.S. Cl.
USPC .......................... 370/328; 370/344

(58) Field of Classification Search .................. 370/328, 370/344
See application file for complete search history.

(56) References Cited

U.S. PATENT DOCUMENTS
6,185,258 B1   2/2001   Alamouti et al.

*Primary Examiner* — Kenny Lin
(74) *Attorney, Agent, or Firm* — Gene Vinokur; Dirk Brinkman

(57) ABSTRACT

Symbols are encoded in a transmitter of a wireless network that uses multiple-input and multiple-output (MIMO) orthogonal frequency division multiplexing (MIMO-OFDM) by partitioning the sub-carriers to be used for transmitting the symbol into a set of K groups of contiguous sub-carriers. For each group k of $N_K-1$ modulation symbols $D_k(1)$, $D_k(2)$, ..., $D_k(N_K-1)$, the modulation symbol $D_k(n)$, for group k, is mapped to a corresponding mapped modulation symbols $X_k(n)$ according to $$m(k) = \frac{1}{N_K - 1} \sum_{n=1}^{N_K-1} D_k(n),$$

$X_k(n) = \alpha_1(k)(D_k(n)-m(k))+\beta(k)$ n=1, ..., $N_K-1$, $X_k(N_K)=\alpha_2(k)m(k)$, where m(k) is a sample-mean of the set of modulation symbols corresponding to the $k^{th}$ group, $\alpha_1(k)$, $\alpha_2(k)$ and $\beta(k)$, for k=1, ..., K, are constants, wherein the constants are predetermined and positive.

12 Claims, 7 Drawing Sheets

IMPLICIT CHANNEL SOUNDING FOR CLOSED-LOOP TRANSMISSION IN MIMO-OFDM WIRELESS NETWORKS

RELATED APPLICATION

This is a Continuation-in-Part Application of U.S. Non-Provision application Ser. No. 12/827,591, "Method for Encoding Data Symbols with Implicitly Embedded Pilot Symbols in Resource Blocks for Wireless Networks," filed by Annavajjala et al., on Jun. 30, 2010, now U.S. Pat. No. 8,284,862 incorporated herein by reference.

FIELD OF INVENTION

This invention relates generally to estimating channels, signal-to-noise ratios (SNR), and signal-to-interference-plus-noise ratios (SINR) for adaptive data transmission in wireless communication networks, and more particularly to channel sounding, channel estimation, and signal quality estimation for closed-loop adaptive modulation and coding techniques with multiple transmitter and multiple receiver antennas over multiple-input and multiple-output (MIMO) orthogonal frequency division multiplexing (MIMO-OFDM) networks.

BACKGROUND OF INVENTION

Multiple-input and multiple-output, orthogonal frequency division multiplexing (MIMO-OFDM) technologies are becoming increasing popular for wireless data communication networks. It is well-known that the spatial degrees of freedom, which MIMO techniques provide, increase data rates without the need for excess transmission bandwidth. OFDM also provides frequency-selective scheduling gains in a MIMO cellular network. Furthermore, the combination of MIMO with OFDM modulation provides high data rate capabilities over wider transmission bandwidths with improved reliability against time- and frequency-selective channel fading, multi-user diversity and interference in cellular wireless networks.

By varying the modulation format, channel code rate, transmission power and signaling duration, adaptive data transmission can exploit the variation of wireless channels to improve reliability performance and increase data throughput. Because MIMO-OFDM wireless networks are characterized by channel selectivity in space, time and frequency domains, conventional wireless networks, such as networks designed according to the IEEE 802.11n, IEEE 802.16e and 3GPP LTE standards, use channel sounding by multiplexing known pilot symbols (pilot tones) with unknown data symbols in an OFDM symbol, i.e., the pilot symbols and the modulation data symbols do not overlap. Thus, a receiver can estimate the space-time-frequency channel and feed back a quality metric for the channels to a transmitter. Then, the transmitter can adjust its transmission parameters, such as modulation format, channel code rate, transmission power and signaling duration to adapt the transmissions to the channels in a rapidly varying environment.

Unfortunately, multiplexing of known pilot symbols with unknown data symbols leads to a reduced number of the data symbols within each OFDM symbol, thereby significantly reducing the data rate per OFDM symbol. More importantly, because the number of pilot symbols needed to sound a highly frequency-selective fading channel is different from the number of pilot symbols needed to sound a frequency-flat fading channel, a priori multiplexing of pilot symbols and data symbols at a specific overhead either wastes the number of sub-carriers to sound a frequency-flat fading channel, and the overhead is insufficient to sound a highly frequency-selective fading channel. Also, because many different configurations are possible in multiplexing the pilot symbols and the data symbols within the sub-carriers of the OFDM network, the consequence is that design and implementation of conventional channel sounding (CS) methods are less flexible.

Implicit Pilot Symbols

In our related application Ser. No. 12/827,591, we first describe the basic principals of our implicitly embedding of pilot symbols in data symbols of resource blocks in MIMO-OFDM networks. That Application deals with the relatively simple case of an open-loop network where there is no feed back of channel state information from the receiver to transmitter. There the assumptions are that the channel coherence time is relatively long, e.g., for an entire resource block or more, and the channel coherence bandwidth is relatively constant. This is adequate for many networks wherein the configuration of the network and the environment is relatively static, e.g., indoor networks where the receivers in computers, laptops and wireless telephones generally move infrequently. In such networks, it is not important to adapt modulation and coding schemes to a rapidly varying environment.

Now, we want to deal with the more difficult case where the above assumptions are not true, and the environment does vary, as in networks operating outdoors, and where the transceivers are highly mobile.

SUMMARY OF THE INVENTION

The embodiments of the invention provide a method for sounding a channel for channel estimation and closed-loop data transmission by utilizing adaptive modulation and coding techniques for multiple-input and multiple-output (MIMO) orthogonal frequency division multiplexing (MIMO-OFDM) networks.

We use implicit channel sounding (ICS). The channel sounding is performed using a predetermined set of OFDM symbols. In each OFDM symbol designated for channel sounding, the transmitter does not transmit any explicit pilot symbols for channel estimation. Instead, these pilot symbols (pilot tones) are implicitly encoded in unknown modulated data symbols. As a result, there is no need for additional allocation of valuable resources such as transmission power, time and bandwidth to transmit explicit pilot symbols.

This leads to significant savings in energy, time and bandwidth resources, thereby improving the overall network power and spectral efficiency. Because all the modulated data symbols in our implicit ICS method encode the known pilot symbols, the invention enables us to estimate a frequency-selective OFDM channel more accurately, and adapt the data rate, modulation order, transmission power, and channel code rate to varying channels for closed-loop transmission.

DETAILED DESCRIPTION OF THE PREFERRED EMBODIMENTS

Figure 1:
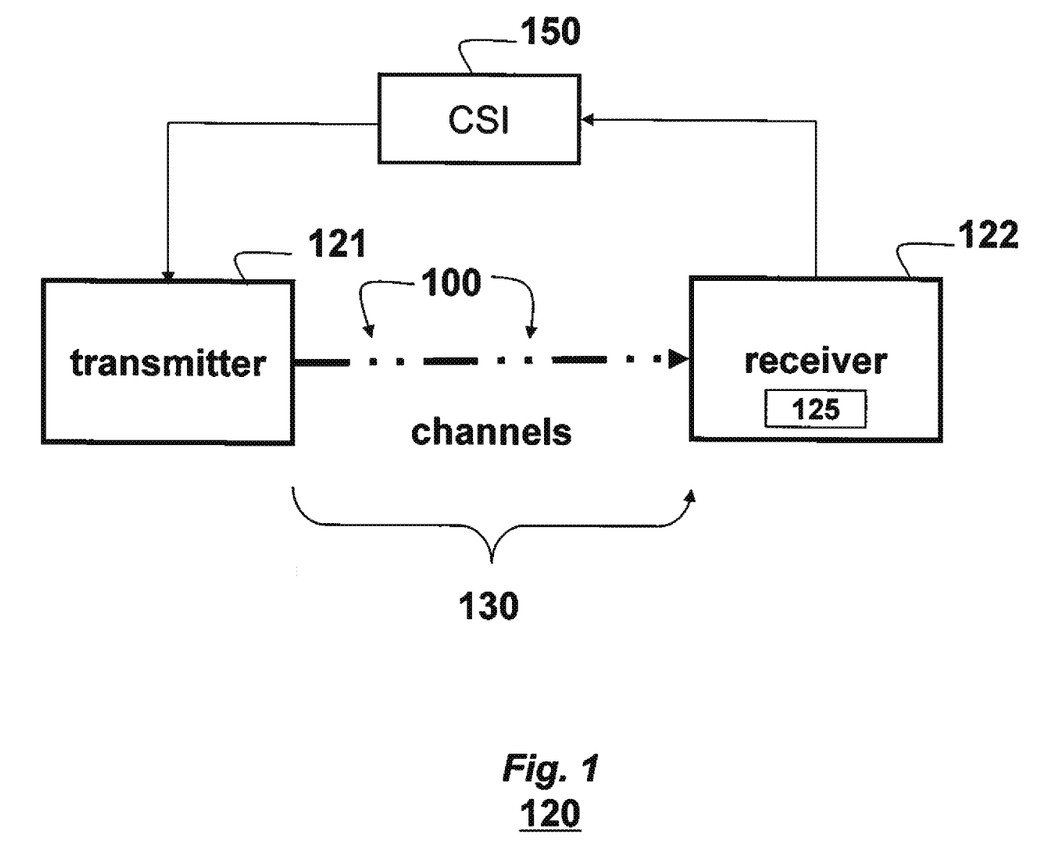
FIG. 1 is a schematic of a wireless network according to embodiments of the invention.

As shown in FIG. 1, the embodiments of our invention provide a method 125 for estimating channels in a multiple-input and multiple-output (MIMO) orthogonal frequency division multiplexing (MIMO-OFDM) network 120. In the network, there is one channel between each transmit and receive antenna pair. With closed-loop feedback, the receiver transmits channel state information (CSI) 150 to the transmitter. The channel estimation enables us to perform closed-loop adaptive modulation and coding techniques at the transmitter. The channels are estimated in receiver 122 using implicit pilot symbols 100 periodically transmitted by the transmitter.

Implicit Channel Sounding for Single-Stream OFDM Networks

Figure 2:
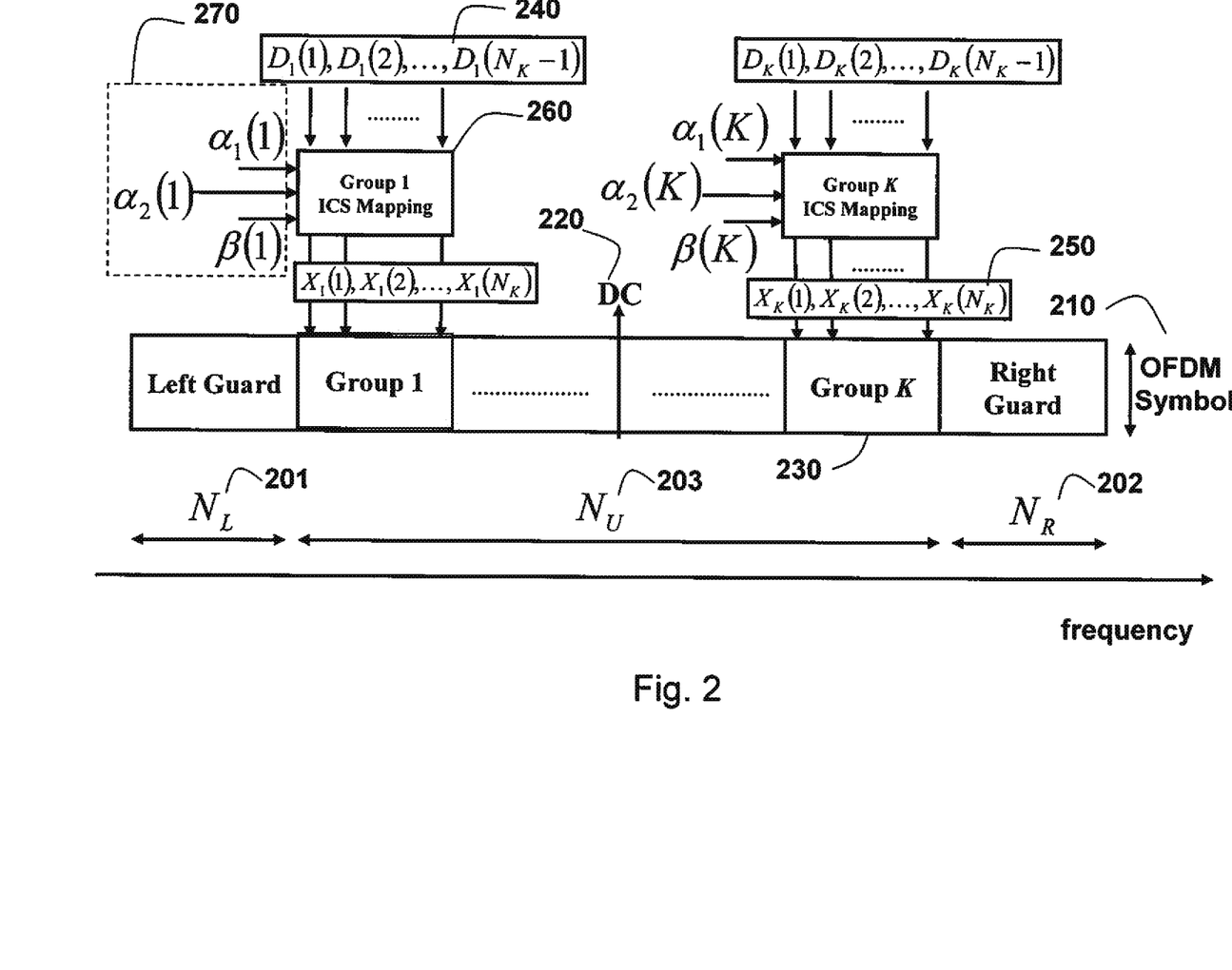
FIGS. 2-3 are block diagrams of OFDM symbols and implicit channel sounding according to embodiments of the invention.

As shown in FIG. 2, we consider an OFDM network that is described by the following network parameters:
the OFDM network bandwidth is W Hz,
the OFDM network sampling frequency is $F_S$ samples per second,
the sub-carrier spacing is $\Delta_f$ Hz,
the number of sub-carriers (or the FFT size) is $N_{FFT}$,
the cyclic prefix length is $N_{CP}$ samples,
the number of left-guard sub-carriers 201 is $N_L$,
the number of right-guard sub-carriers is $N_R$, and
the number of sub-carriers in an OFDM symbol 210 is $$N_U = N_{FFT} - N_L - N_R - 1,$$

ignoring a DC sub-carrier 220.

For an example IEEE 802.16e network operating over a channel with a 10 MHz bandwidth, W=10 MHz, $F_S$=11.2 M samples per second, $\Delta_f$=10.9375 kHz, $N_{FFT}$=1024, $N_{CP}$=128 samples, $N_L$=92 sub-carriers, $N_R$=91 sub-carriers, and $N_U$=1024−92−91−1=840. Values of W, $F_S$, $\Delta_f$, $N_{FFT}$, $N_{CP}$, $N_L$, $N_R$, and $N_U$ can also be obtained for other wireless standards such as IEEE 802.11n and 3GPP LTE networks.

The available number of sub-carriers, $N_U$, is partitioned into a set of K contiguous groups 230, wherein each group includes $$N_K = \frac{N_U}{K}$$

sub-carriers, where $N_K$ is an integer.

Because OFDM networks typically experience frequency selective channel fading, the number of sub-carriers within a group, $N_K$, is selected such that $N_K$ exceeds the normalized channel coherence bandwidth $N_C$ $$N_C = \text{round}\left(\frac{1}{5\sigma_{RMS}\Delta_f}\right),$$

where round(x) is a nearest integer to x, and $\sigma_{RMS}$ is a root-mean-square (RMS) channel delay-spread. With the above value of $N_C$, we need $N_K \leq N_C$ so that we can reasonably approximate the channel over $N_K$ consecutive sub-carriers as frequency-invariant.

A set of $N_K$−1 modulation symbols to be transmitted over the $k^{th}$ group of $N_K$ sub-carriers is $D_k(1), D_k(2), D_k(N_K-1)$ 240. The transmitted symbols on these $N_K$ sub-carriers are $X_k(1), X_k(2), \ldots, X_k(N_K)$ 250.

The following describes a mapping 260 of $D_k(1), D_k(2), \ldots, D_k(N_K-1)$ to $X_k(1), X_k(2), \ldots, X_k(N_K)$. Each of the $N_K$ symbols in the $k^{th}$ group is transmitted with an average energy of $E_S(k)$. If $E_S$ is the average energy of each of the N−1 transmitted mapped data symbols, then predetermined positive constants $\alpha_1$ $\alpha_2$ and $\beta$ 211 are respectively selected according to the following functions as $$\alpha_1(k) = \sqrt{E_S(k)}$$

$$\alpha_2(k) = \sqrt{(N_K - 1)E_S(k)}, \text{ for } k = 1 \text{ to } K.$$

$$\beta(k) = \sqrt{\frac{E_S(k)}{N_K - 1}}$$

Note that this formulation is different than the corresponding function in the related Application incorporated herein by reference. There, the mapping is over the symbols and sub-carriers of an entire resource block. In contrast, here as shown in FIG. 2 the mapping is over groups of sub-carriers of a single OFDM symbol. As an advantage, the mapping can adapt to carrying channel conditions on a symbol-per-symbol basis, whereas our previous mapping demands a relatively long channel coherence time.

Using the values $\alpha_1(k)$, $\alpha_2(k)$ and $\beta(K)$, the ICS mapping rule for the $k^{th}$ group is described in the following steps:

Step 1: Input the $N_K$−1 modulation symbols $D_k(1), D_k(2), \ldots, D_k(N_K-1)$ 240;

Input the positive constants $\alpha_1(k)$, $\alpha_2(k)$ and $\beta(k)$ 211; and Step 2: Perform the ICS data mapping 260 according to $$m(k) = \frac{1}{N_K - 1}\sum_{n=1}^{N_K-1} D_k(n)$$

$$X_k(n) = \alpha_1(n)(D_k(n) - m(k)) + \beta(k) \; n = 1, \ldots, N_K - 1$$

$$X_k(N_K) = \alpha_2(k)m(k),$$

where m(k) is a sample-mean of the set of modulation symbols $\alpha_1$, $\alpha_2$ and $\beta$ are predetermined positive constants described in detail below.

Note that this formulation is also different than the corresponding function in the related Application.

The output of the ICS mapping unit for the $k^{th}$ group of $N_K$−1 modulation symbols are mapped modulation symbols $X_k(1), X_k(2), \ldots, X_k(N_K)$ 250. The above ICS mapping rule is repeated for all the K groups with the following input and output modulation symbols, For k=1 to K:

Input Constellation Symbols: $D_k(1), D_k(2), \ldots, D_k(N_K-1)$;

Input the positive constants $\alpha_1(k)$, $\alpha_2(k)$ and $\beta(k)$;

Perform Step 1 and Step 2 of the ICS data mapping rule; and

Output modulation symbols: $X_k(1), X_k(2), \ldots, X_k(N_K)$

It is important to note that the ICS mapping rule described in Steps 1 and step 2 is valid for any choice of $\alpha_1(k)$, $\alpha_2(k)$ and $\beta(k)$, and is not restricted to the exemplary choice of $\alpha_1(k), \alpha_2(k)$ and $\beta(k)$. r The total number of modulation symbols inserted into the OFDM symbol is $K(N_K-1)=N_U-K$, and the number of sub-carriers is $N_U$. That is, the efficiency of the proposed ICS mapping invention is $$\frac{N_U - K}{N_U} = 1 - \frac{K}{N_U}$$

per sub-carriers, and the overall efficiency, by taking into the number of left, right, and DC sub-carriers, is $$\frac{N_U - K}{N_{FFT}} = \left(1 - \frac{K}{N_U}\right)\frac{N_U}{N_{FFT}} = \left(1 - \frac{K}{N_U}\right)\left(1 - \frac{N_L + N_R + 1}{N_{FFT}}\right).$$

As an example, for the IEEE 802.16e network operating over 10 MHz channel bandwidth, we have $N_{FFT}=1024$, $N_L=92$ sub-carriers, $N_R=91$ sub-carriers, and the number of used sub-carriers is $N_U=1024-92-91-1=840$. With $K=84$ and $N_K=840/84=8$, the efficiency per used sub-carrier is $$1 - \frac{84}{840} = 9/10 = 90$$

percent, whereas the overall efficiency per OFDM symbol is $$\frac{9}{10} \times \frac{840}{1024} = 73.82$$

percent.

Like in our previous Application, and in contrast with conventional channel sounding techniques, our ICS mapping does not require transmission of known pilot symbols. Because our ICS mapping uses all available sub-carriers for data transmission, while simultaneously performing channel sounding, there is a significant efficiency improvement in the number of sub-carriers that are actually used for data transmission.

Using our ICS technique, we now describe methods of estimating the frequency-domain OFDM channel and detection of individual modulation symbols $$D_1(1), D_1(2), \ldots, D_1(N_K-1), \ldots, D_k(1)D_k(2), \ldots, D_k(N_K-1).$$

Figure 4:
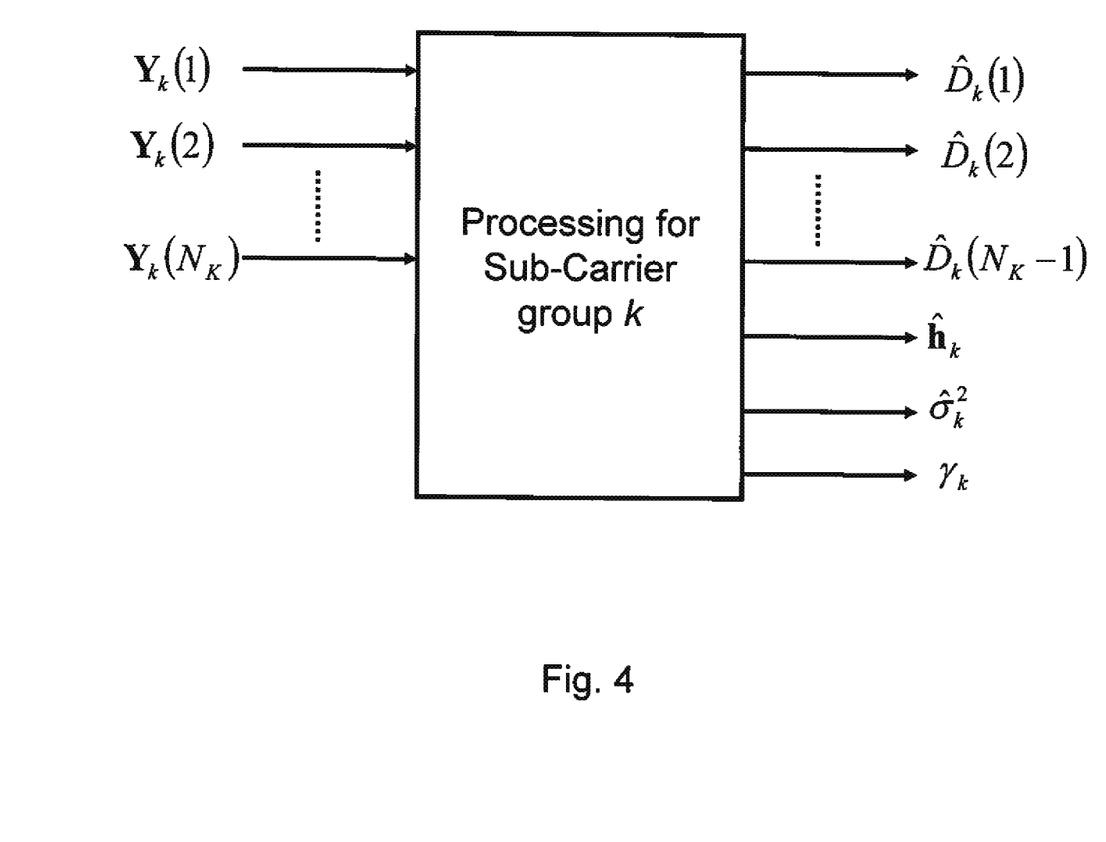
FIG. 4 is a block diagram of processing a sub-carrier group according to embodiments of the invention.

Because the number of sub-carriers $N_K$ in a group is selected to be less than the channel coherence bandwidth $N_C$, we assume that the channel within a group of $N_K$ sub-carriers is constant. For the $k^{th}$ group, the received signal on each of the $N_K$ sub-carriers within a given OFDM symbol is given by $$\begin{bmatrix} Y_{k,1}(n) \\ Y_{k,2}(n) \\ \vdots \\ Y_{k,L}(n) \end{bmatrix} = \begin{bmatrix} H_{k,1} \\ H_{k,2} \\ \vdots \\ H_{k,L} \end{bmatrix} X_k(n) + \begin{bmatrix} Z_{k,1}(n) \\ Z_{k,2}(n) \\ \vdots \\ Z_{k,L}(n) \end{bmatrix}, n = 1, \ldots, N_K, k = 1, \ldots, K,$$

where $Y_{k,l}(n)$ is the received signal on sub-carrier n of the group k at receiver antenna l, $H_{k,l}$ is the channel response of the group k at receiver antenna l, and $Z_{k,l}(n)$ is the interference-plus-noise component on sub-carrier n of the group k at receiver antenna l. Upon stacking the elements $Y_{k,l}(n)$, $l=1, \ldots, L$, into one vector $$Y_k(n)=[Y_{k,1}(n) \ldots Y_{k,L}(n)]^T,$$

and similarly for $$h_k=[H_{k,1} \ldots H_{k,L}]^T,$$

we can write $$Y_k(n)=h_k X_k(n)+Z_k(n),$$

where $$Z_k(n)=[Z_{k,1}(n) Z_{k,L}(n)]^T$$

is the vector-valued noise-plus-interference on sub-carrier n of the group k, for k=1 to K.

Estimation of frequency-domain channel for the $k^{th}$ group $$\hat{h}_k = \frac{\sum_{n=1}^{N_K-1} Y_k(n)}{\beta(k)(N_K - 1)} = h_k + \frac{\sum_{n=1}^{N_K-1} Z_k(n)}{\beta(k)(N_K - 1)}.$$

Demodulate the symbols within the $k^{th}$ group $$\hat{D}_k(n) = \frac{1}{\alpha_1(k)}\left(\frac{\hat{h}_k^H Y_k(n)}{\hat{h}_k^H \hat{h}_k} - \beta(k)\right) + \frac{1}{\alpha_2(k)}\frac{\hat{h}_k^H Y_k(N_K)}{\hat{h}_k^H \hat{h}_k},$$

where n=1, \ldots, $N_K-1$.

After the channels for each of the K groups are obtained, the overall frequency domain channel within the $N_U$ used sub-carries is $$\begin{bmatrix} \hat{H}_1(n) \\ \hat{H}_2(n) \\ \vdots \\ \hat{H}_L(n) \end{bmatrix} = \hat{h}_{\lceil \frac{n}{N_K} \rceil}, \text{ for } n = 1 \text{ through } N_U,$$

where $\lceil x \rceil$ is the ceiling of x and $\hat{H}_l(n)$ is the estimate of channel on sub-carrier n on receiver antenna l.

The above described embodiment assumes that all the $N_U$ sub-carriers within a given OFDM symbol are utilized for data transmission. If only a smaller number of sub-carrier groups are employed, i.e., less than K groups, i.e., the number of groups is <K, we can still estimate the channel on each of those used sub-carrier groups, $\hat{h}_k$, as described above, and perform a frequency-domain interpolation process, such as linear, spline and windowing based interpolation algorithms, to estimate the channel on the remaining sub-carrier groups.

Figure 5:
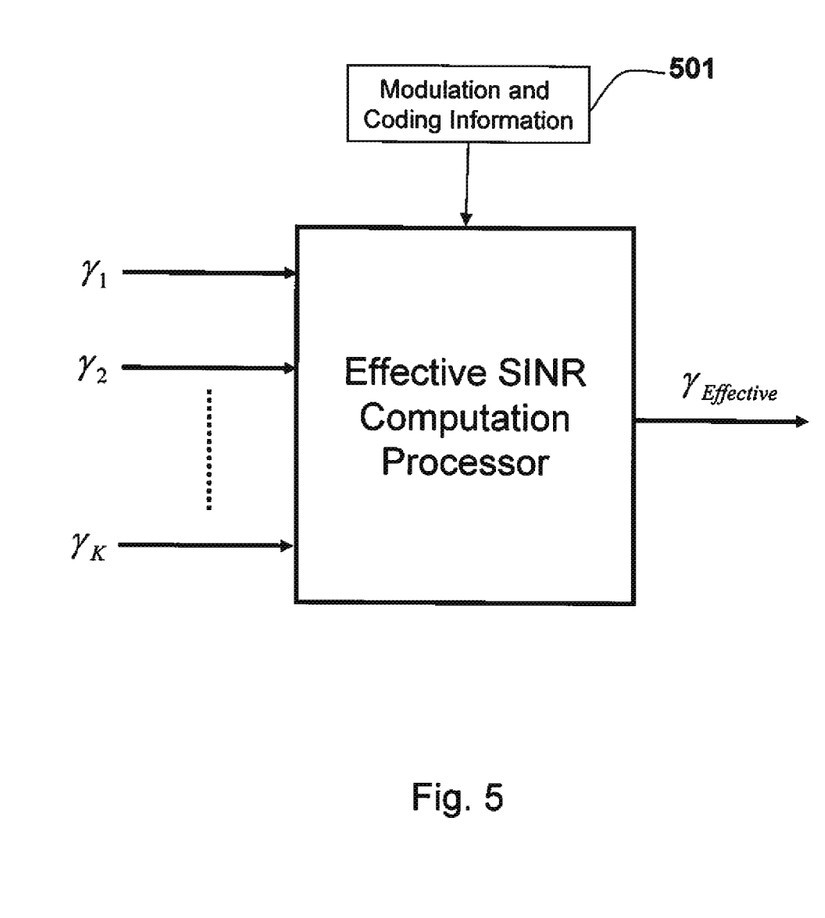
FIG. 5 is a block diagram of an SINR computation processer according to embodiment of the invention.

An estimate of the average noise power, per receiver antenna (channel), for the $k^{th}$ group of $N_K$ sub-carriers is computed as $$\hat{\sigma}_k^2 = \frac{1}{LN_K}\sum_{n=1}^{N_K} \| Y_k(n) - \hat{h}_k \hat{X}_k(n) \|^2$$

$$= \frac{1}{LN_K}\sum_{n=1}^{N_K} \| Y_k(n) - \frac{\hat{h}_k^H Y_k(n)}{\hat{h}_k^H \hat{h}_k}\hat{h}_k \|^2.$$

Using the above estimated noise power, and an estimate of the channel $\hat{h}_k$ on the $k^{th}$ sub-group, the effective signal-to-noise ratio (SNR) for the $k^{th}$ group of $N_K$ sub-carriers is computed as $$\gamma_k = \frac{\hat{h}_k^H \hat{h}_k}{\hat{\sigma}_k^2} = \sum_{l=1}^{L} \frac{|\hat{H}_{k,l}|^2}{\hat{\sigma}_k^2}.$$

The estimated SNR values, $\gamma_1, \gamma_2, \ldots, \gamma_K$, can now be utilized to determine an appropriate choice of the modulation order and channel code rate. If we use well-known channel abstraction techniques, such as mean mutual information per bit (MMIB), received bit information rate (RBIR), or exponentially effective SNR mapping (EESM) rule as specified for the IEEE 802.16m-08/004 r2 standard, in Evaluation Methodology Document (EMD), Srinivasan et al., Jul. 3, 2008, then a measure of the channel quality over the K groups is necessary.

Using $\gamma_1, \gamma_2, \ldots, \gamma_K$, the effective SNR over the K groups with EESM rule is $$\gamma_{Effective} = -c\log\left(\frac{1}{K}\sum_{k=1}^{K} e^{-\frac{\gamma_k}{c}}\right)$$

$$= -c\log\left(\frac{1}{K}\sum_{k=1}^{K} e^{-\frac{\hat{h}_k^H \hat{h}_k}{c\hat{\sigma}_k^2}}\right)$$

$$= -c\log\left(\frac{1}{K}\sum_{k=1}^{K} e^{-\sum_{l=1}^{L} \frac{|\hat{H}_{k,l}|^2}{c\hat{\sigma}_k^2}}\right),$$

where c is a constant that depends on the modulation and coding employed. In practice, values of c are obtained a priori using the channel-level simulation techniques. When c is not known a priori, or when c takes very large negative values, the following metric can be used to represent the effective SNR over the K groups $$\gamma_{Effective} = \frac{1}{K}\sum_{k=1}^{K} \gamma_k = \frac{1}{K}\sum_{k=1}^{K} \frac{\hat{h}_k^H \hat{h}_k}{\hat{\sigma}_k^2} = \frac{1}{K}\sum_{k=1}^{K} \sum_{l=1}^{L} \frac{|\hat{H}_{k,l}|^2}{\hat{\sigma}_k^2}$$

$$= \gamma_{Avg},$$

which is the SNR averaged over the K groups.

Using $\gamma_{Effective}$ in conjunction with an estimated block error rate (or the frame error rate) performance curves corresponding to the additive white Gaussian noise (AWGN) channel, e.g., using a look-up table, enables us to determine the appropriate choice of modulation order and channel code rate.

Implicit Channel Sounding for MIMO-OFDM Networks

Figure 3:
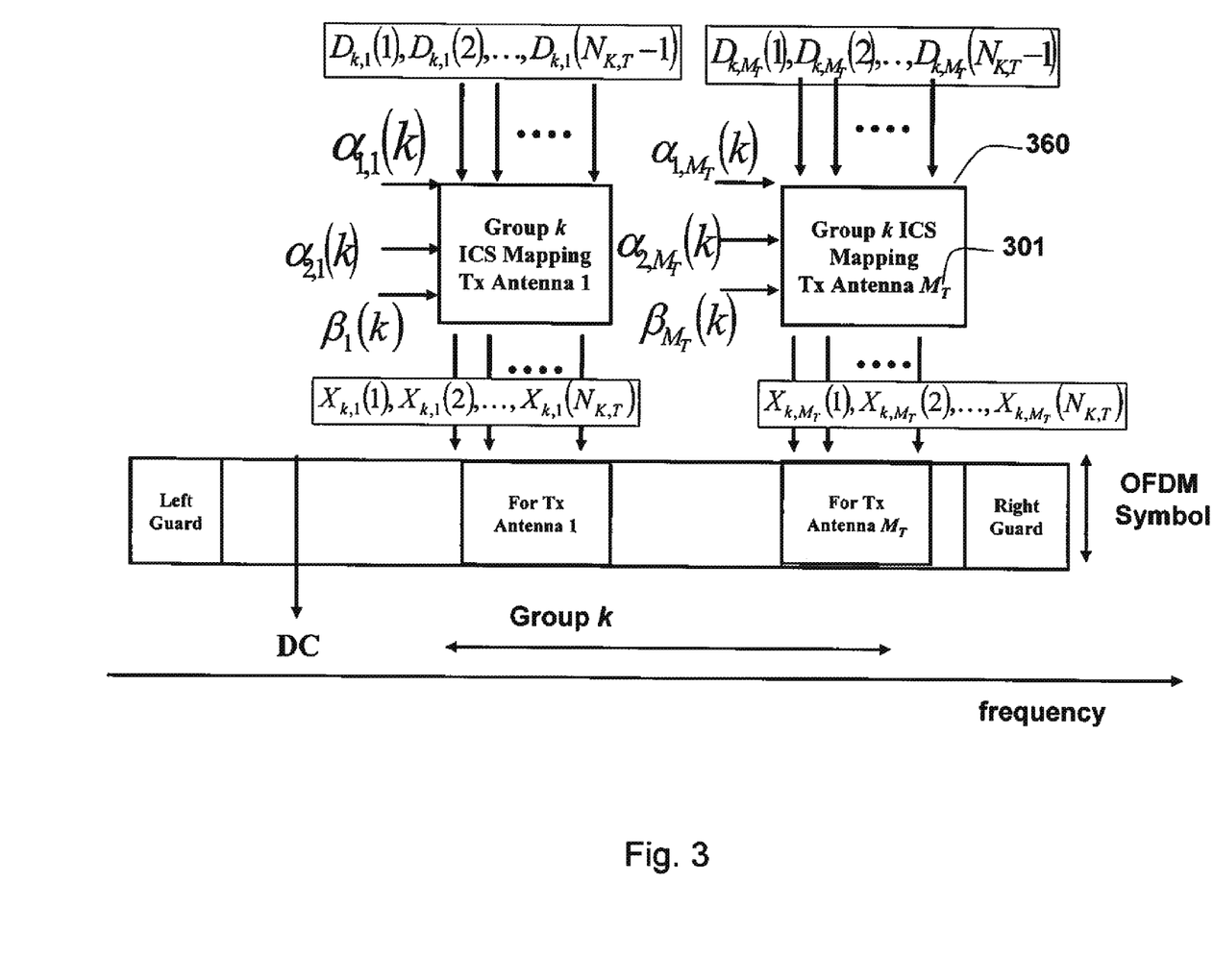

As shown in FIG. 3, we now describe MIMO-OFDM networks with multiple transmitter antennas. Here, the number of transmitter antennas is $M_T$ and the number of antennas at the receiver is $M_R$.

Similar to the single transmitter antenna case, we first divide the available number of sub-carriers $N_U$ into K contiguous groups, where each group comprises of $$N_K = \frac{N_U}{K}$$

sub-carriers. It should be noted that K is again selected so that $N_K$ is an integer. Next, the $N_K$ sub-carriers in a given group are divided into $M_T$ sub-groups in such a way that each sub-group contains $$N_{K,T} = \frac{N_K}{M_T}$$

sub-carriers. Note that for a given $M_T$, $N_K$ has to be selected in such a way that $M_T$ divides $N_K$ so that $N_{K,T}$ becomes an integer. As an example, with $M_T=2$ transmitter antennas, K=84 and $N_K=8$, we have $$N_{K,T} = \frac{8}{2} = 4.$$

We denote by $D_{k,l}(1), D_{k,l}(2), \ldots, D_{k,l}(N_{K,T}-1)$ the $N_{K,T}-1$ modulation symbols assigned for $k^{th}$ group on the $l^{th}$ transmitter antenna. The ICS mapping rule with multiple transmitter antenna takes $$D_{k,l}(1), D_{k,l}(2), \ldots, D_{k,l}(N_{K,T}-1)$$

as the input and produces $X_{k,l}(1), X_{k,l}(2), \ldots, X_{k,l}(N_{K,T})$, where $X_{k,l}(n)$ is the modulation symbol that is transmitted on sub-carrier n assigned to $k^{th}$ group on the $l^{th}$ transmitter antenna.

Each of the $N_{K,T}$ symbols, $X_{k,l}(1), X_{k,l}(2), \ldots, X_{k,l}(N_{K,T})$, in the $k^{th}$ group corresponding to the $l^{th}$ transmitter antenna is transmitted with an average symbol energy of $E_{S,l}(k)$. Then, we define the following parameters for k=1 to $N_K$ and l=1 to $M_T$, $$\alpha_{1,l}(k) = \sqrt{E_{S,l}(k)}$$

$$\alpha_{2,l}(k) = \sqrt{(N_{K,T}-1)E_{S,l}(k)}$$

$$\beta_l(k) = \sqrt{\frac{E_{S,l}(k)}{N_{K,T}-1}}.$$

Using the above values of $\alpha_{1,l}(k)$, $\alpha_{2,l}(k)$ and $\beta_l(k)$, the ICS mapping rule for the $k^{th}$ group with $l^{th}$ transmitter antenna is described in the following steps:

Step 1: Input the $N_{K,T}-1$ modulation symbols $$D_{k,l}(1), D_{k,l}(2), \ldots, D_{k,l}(N_K-1)$$

Input the positive constants $\alpha_{1,l}(k)$, $\alpha_{2,l}(k)$ and $\beta_l(k)$.
Step 2: Perform the ICS data mapping:

$$m_l(k) = \frac{1}{N_{K,T}-1} \sum_{n=1}^{N_{K,T}-1} D_k(n)$$

$$X_{k,l}(n) = \alpha_{1,l}(k)(D_{k,l}(n) - m_l(k)) + \beta_l(k) \quad n = 1, \ldots, N_{K,T}-1$$

$$X_{k,l}(N_{K,T}) = \alpha_{2,l}(k)m_l(k)$$

The output of the ICS mapping unit for the $k^{th}$ group of $N_{K,T}-1$ modulation symbols to be transmitted on $l^{th}$ transmitter antenna is $$X_{k,l}(1), X_{k,l}(2), \ldots, X_{k,l}(N_{K,T}).$$

The above ICS mapping rule is repeated for all the K groups on all the $M_T$ transmitter antennas with the following input and output modulation symbols for k=1 to K, and l=1 to $M_T$:

Input Constellation Symbols:

$$D_{k,I}(1), D_{k,I}(2), \ldots, D_{k,I}(N_{K,T}-1);$$

Input the positive constants $\alpha_{1,I}(k)$, $\alpha_{2,I}(k)$ and $\beta_I(k)$, Perform Step 1 and Step 2 of the ICS data mapping rule; and Output modulation symbols: $X_{k,I}(1)$, $X_{k,I}(2)$, ..., $X_{k,I}(N_{K,T})$.

It is important to note that the ICS mapping rule in Steps 1 and step 2 is valid for any choice of $\alpha_{1,I}(k)$, $\alpha_{2,I}(k)$ and $\oplus_I(k)$, and is not restricted to the exemplary choice of $\alpha_{1,I}(k)$, $\alpha_{2,I}(k)$ and $\beta_I(k)$ given preceding to Steps 1 and step 2.

It is also instructive to note that when $M_T=1$, this mapping rule reduces to the previous mapping rule.

The total number of modulation symbols inserted into the OFDM symbol with $M_T$ transmitter antennas is $$KM_T(N_{K,T}-1) = N_U - KM_T,$$

and the number sub-carriers is $N_U$. That is, the efficiency of the ICS mapping for $M_T$ transmitter antennas is $$\frac{N_U - KM_T}{N_U} = 1 - \frac{KM_T}{N_U}$$

per used sub-carriers, and the overall efficiency, by taking into the number of left, right, and DC sub-carriers, is $$\frac{N_U - KM_T}{N_{FFT}} = \left(1 - \frac{KM_T}{N_U}\right)\frac{N_U}{N_{FFT}} = \left(1 - \frac{KM_T}{N_U}\right)\left(1 - \frac{N_L + N_R + 1}{N_{FFT}}\right)$$

As an example, for the IEEE 802.16e network operating over 10 MHz channel bandwidth, we have $N_{FFT}=1024$, $N_L=92$ sub-carriers, $N_R=91$ sub-carriers, and the number of used sub-carriers is $N_U=1024-92-91-1=840$.

With $K=84$, $M_T=2$, and $N_K=840/84=8$, the efficiency per used sub-carrier is $$1 - \frac{84 \times 2}{840} = 8/10 = 80$$

percent, whereas the overall efficiency per OFDM symbol is $$\frac{8}{10} \times \frac{840}{1024} = 65.61$$

percent.

Figure 6:
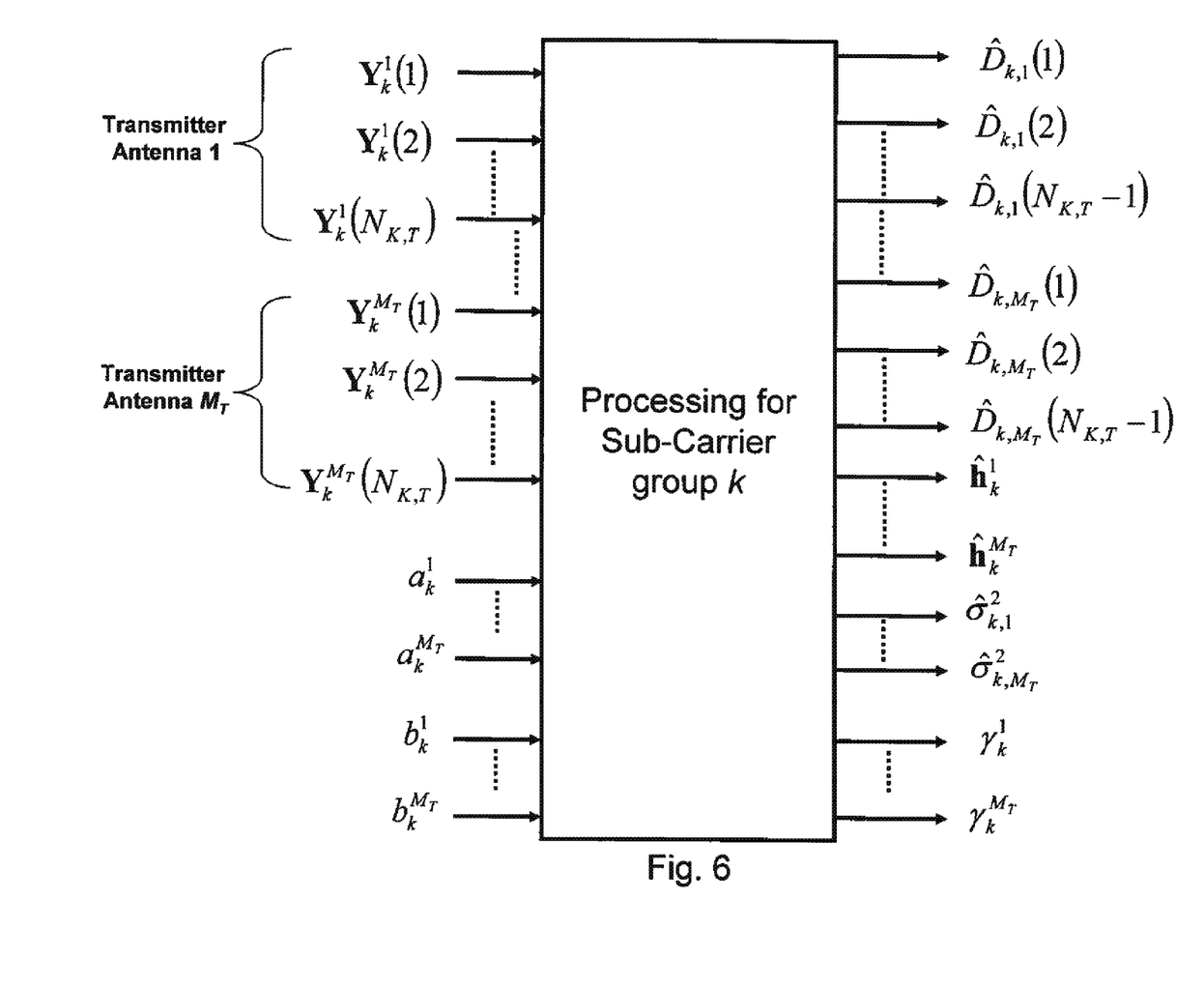
FIG. 6 is a block diagram of processing a sub-carrier group for multiple antennas according to embodiments of the invention.
Figure 7:
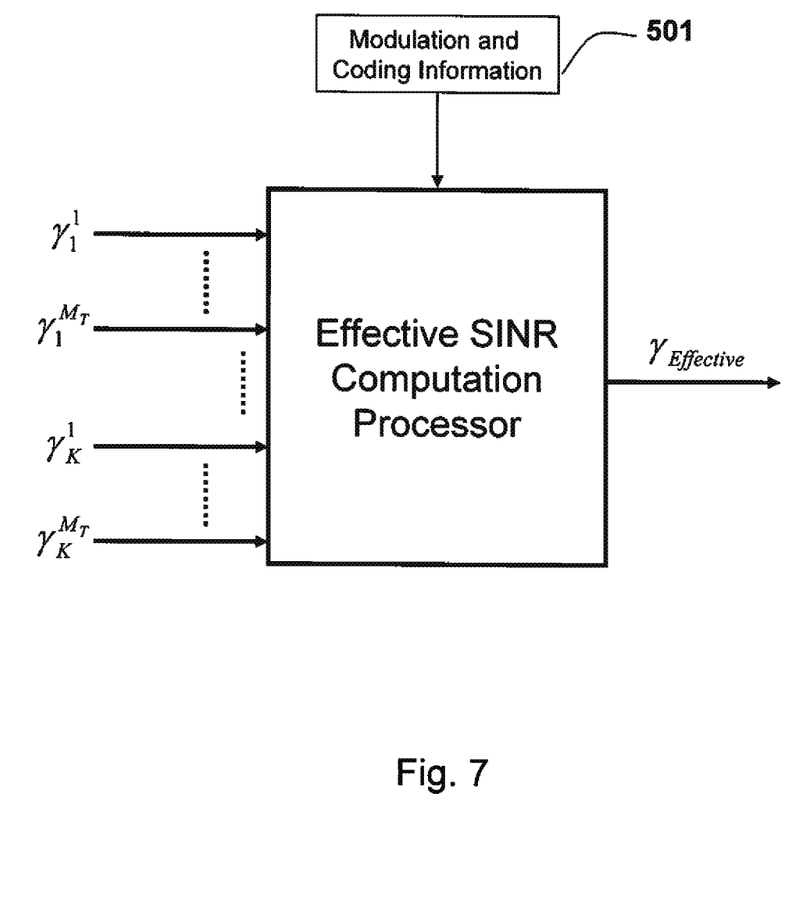
FIG. 7 is a block diagram of an SINR computation processer according to embodiment of the invention.

FIG. 4 shows the processing of each group at the receiver, FIG. 5 shows the process for computing the effective SINR, and FIG. 6 shows the processing of each group for multiple antennas, and FIG. 7 shows the process for computing the effective SINR using multiple antennas, all described in detail herein.

For the $k^{th}$ group, the received signal on each of the $N_{K,T}$ sub-carriers corresponding to transmitter antenna m within a given OFDM symbol is given by $$\begin{bmatrix} Y_{k,1}^m(n) \\ Y_{k,2}^m(n) \\ \vdots \\ Y_{k,L}^m(n) \end{bmatrix} = \begin{bmatrix} H_{k,1}^m \\ H_{k,2}^m \\ \vdots \\ H_{k,L}^m \end{bmatrix} X_{k,m}(n) + \begin{bmatrix} Z_{k,1}^m(n) \\ Z_{k,2}^m(n) \\ \vdots \\ Z_{k,L}^m(n) \end{bmatrix}, n = 1,$$

$$\ldots, N_{K,T}, k = 1, \ldots, K, m = 1, \ldots, M_T,$$

where $Y_{k,l}^m(n)$ is the received signal on sub-carrier n of the group k at receiver antenna l when $X_{k,m}(n)$ is transmitted from the transmitter antenna m, $H_{k,l}^m$ is the channel response of the group k between the receiver antenna l and transmitter antenna m, and $Z_{k,l}^m(n)$ is the interference-plus-noise component on sub-carrier n of the group k at receiver antenna l due to transmitter antenna m. Upon stacking the elements $Y_{k,l}^m(n)$, $l=1, \ldots, L$, into one vector $$Y_k^m(n) = [Y_{k,1}^m(n) \ldots Y_{k,L}^m(n)]^T,$$

and similarly $$h_k^m = [H_{k,1}^m \ldots H_{k,L}^m]^T,$$

we can write $$Y_k^m(n) = h_k^m X_{k,m}(n) + Z_k^m(n),$$

where $$Z_k^m(n) = [Z_{k,1}^m(n) \ldots Z_{k,L}^m(n)]^T$$

is the vector-valued noise-plus-interference on sub-carrier n of the group k when transmitter antenna m is used.

We now estimate the vector-valued channels $h_k^m$ for each transmitter antenna and for each group as follows, for $k=1$ to K, and $m=1$ to $M_T$.

Estimation of frequency-domain channel from transmitter m $$\hat{h}_k^m = \frac{\sum_{n=1}^{N_{K,T}-1} Y_k^m(n)}{\beta_m(k)(N_{K,T}-1)} = h_k^m + \frac{\sum_{n=1}^{N_{K,T}-1} Z_k^m(n)}{\beta_m(k)(N_{K,T}-1)}.$$

Demodulate the $N_{K,T}-1$ symbols transmitted by transmitter m within the $k^{th}$ group $$\hat{D}_{k,m}(n) = \frac{1}{\alpha_{1,m}(k)} \left( \frac{(\hat{h}_k^m)^H Y_k^m(n)}{(\hat{h}_k^m)^H \hat{h}_k^m} - \beta_m(k) \right) + \frac{1}{\alpha_{2,m}(k)} \frac{(\hat{h}_k^m)^H Y_k^m(N_{K,T})}{(\hat{h}_k^m)^H \hat{h}_k^m},$$

where $n=1, \ldots, N_{K,T}-1$.

After the channels for each of the K groups from each of the $M_T$ transmitter antennas are obtained, the overall frequency domain channel within the $N_U$ used sub-carries is, for or $n=1$ to $N_U$, $$\begin{bmatrix} \hat{H}_1^m(n) \\ \hat{H}_2^m(n) \\ \vdots \\ \hat{H}_L^m(n) \end{bmatrix} = \hat{h}^m \lceil \frac{n}{N_K} \rceil,$$

where $\lceil x \rceil$ is the ceiling of x and $\hat{H}_l^m(n)$ is the estimate of channel on sub-carrier n between receiver antenna l and transmitter antenna m.

An estimate of the noise variance on each of the L receiver antennas due to transmission from transmitter antenna m, for the $k^{th}$ group of $N_K$ sub-carriers, is $$\hat{\sigma}^2_{k,m} = \frac{1}{LN_{K,T}} \sum_{n=1}^{N_{K,T}} \| Y_k^m(n) - \hat{h}_k^m \hat{X}_{k,m}(n) \|^2$$

$$= \frac{1}{LN_{K,T}} \sum_{n=1}^{N_{K,T}} \| Y_k^m(n) - \frac{(\hat{h}_k^m)^H Y_k^m(n)}{(\hat{h}_k^m)^H \hat{h}_k^m} \hat{h}_k^m \|^2$$

Using the above estimated noise power, and an estimate of the channel $\hat{h}_k^m$ on the $k^{th}$ sub-group corresponding to transmitter antenna m, the effective signal-to-interference-plus-noise ratio (SINR) for the $k^{th}$ group of $N_K$ sub-carriers when to transmitter antenna m is used is $$\gamma_k^m = a_k^m(b_k^m \gamma_{k,MRC}^m + (1-b_k^m)\gamma_{k,MMSE}^m(\hat{\sigma}_{k,m}^2))$$

where $\gamma_{k,MRC}^m$ is the resulting SNR when maximum ratio combining (MRC) receiver is employed and $\gamma_{k,MMSE}^m(\lambda)$ is the resulting SINR when linear minimum mean-square error (MMSE) receiver is employed with parameter $\lambda$. In the above equation, $a_k^m$ is a positive constant that serves as a bias term, and $0 \leq b_k^m \leq 1$.

One approach to obtaining appropriate values of $a_k^m$ and $b_k^m$ is using channel-level simulations. The SNR and SINR terms $\gamma_{k,MRC}^m$ and $\gamma_{k,MMSE}^m(\lambda)$ in the above equation are obtained as $$\gamma_{k,MRC}^m = \frac{(\hat{h}_k^m)^H \hat{h}_k^m}{\hat{\sigma}_{k,m}^2} = \sum_{l=1}^{L} \frac{|\hat{H}_{k,l}^m|^2}{\hat{\sigma}_{k,m}^2}$$

and $$\gamma_{k,MMSE}^m(\hat{\sigma}_{k,m}^2) = \frac{1}{G_k^{(\hat{\sigma}_{k,m}^2)}(m,m)} - 1$$

where $$G_k^{(\lambda)} = \left[ \lambda I_{M_T} + \begin{bmatrix} (\hat{h}_k^1)^H \\ (\hat{h}_k^2)^H \\ \vdots \\ (\hat{h}_k^{M_T})^H \end{bmatrix} \begin{bmatrix} \hat{h}_k^1 & \hat{h}_k^2 & \dots & \hat{h}_k^{M_T} \end{bmatrix} \right]^{-1}$$

is of size $M_T$-by-$M_T$, $I_{M_T}$ is the $M_T$-by-$M_T$ identity matrix, and $G_k^{(\lambda)}(m,m)$ is the element correspond to $m^{th}$ row and $m^{th}$ column of $G_k^{(\lambda)}$.

It is important to note that our SINR estimate $\gamma_k^m$ is quite general and leads to the following special cases:
- By setting $\lambda=0$ in $G_k^{(\lambda)}$, $a_k^m=1$ and $b_k^m=1$, we obtain the SNR corresponding to MRC receiver;
- By setting $\lambda=0$ in $G_k^{(\lambda)}$, $a_k^m=1$ and $b_k^m=0$, we obtain the SINR corresponding to a linear zero-forcing receiver;
- By setting $\lambda=\hat{\sigma}_{k,m}^2$ in $G_k^{(\lambda)}$, $a_k^m=1$ and $b_k^m=0$, we obtain the SINR corresponding to a linear MMSE receiver; and
- By setting $\lambda=\hat{\sigma}_{k,m}^2$ in $G_k^{(\lambda)}$, and proper choice of $a_k^m$ and $b_k^m$, we obtain an approximation of the SINR estimate for MIMO networks with non-linear maximum-likelihood (ML) receiver.

Thus, the SINR estimate $\gamma_k^m$ is valid for both linear and non-linear receiver algorithms.

Upon using $\gamma_k^m$ for $k=1, \ldots, K$, and $m=1, \ldots, M_T$, the effective SINR over the K groups with EESM rule is given by $$\gamma_{Effective} = -c\log\left(\frac{1}{K}\frac{1}{M_T}\sum_{m=1}^{M_T}\sum_{k=1}^{K} e^{-\frac{\gamma_k^m}{c}}\right)$$

$$= -c\log\left(\frac{1}{K}\frac{1}{M_T}\sum_{m=1}^{M_T}\sum_{k=1}^{K} e^{-\frac{a_k^m(b_k^m \gamma_{k,MRC}^m + (1-b_k^m)\gamma_{k,MMSE}^m(\lambda_k^m))}{c}}\right),$$

where c is a constant that depends on the modulation and coding 501 employed. In practice, values of c are obtained a priori using the channel-level simulation techniques.

When c is not known a priori, or when c takes very large negative values, it is not uncommon to use the following metric to represent the effective SNR over the K groups:

$$\gamma_{Effective} = \frac{1}{K}\frac{1}{M_T}\sum_{m=1}^{M_T}\sum_{k=1}^{K} \gamma_k^m$$

$$= \frac{1}{K}\frac{1}{M_T}\sum_{m=1}^{M_T}\sum_{k=1}^{K} [a_k^m(b_k^m \gamma_{k,MRC}^m + (1-b_k^m)\gamma_{k,MMSE}^m(\lambda_k^m))]$$

Using $\gamma_{Effective}$ in conjunction with the (block or frame) error rate performance curves corresponding to the additive white Gaussian noise (AWGN) channel enables us to determine the appropriate choice of modulation order and channel code rate.

Implicit Channel Sounding for Multi-User MIMO-OFDM Networks

Above, we described ICS between a single transmitter and a single receiver utilizing MIMO-OFDM techniques. This approaches can be extended to the case of multiple users.

When $K_{User}$ users (transceivers) are present in the network, each with $M_T$ transmitter antennas, we do the following operations to perform ICS.

Similar to the single user case, we partition the available number of sub-carriers, $N_U$, into K contiguous groups, where each group comprises of $$N_K = \frac{N_U}{K}$$

sub-carriers. It should be noted that K is selected in such a way that is an integer.

From the available K sub-carrier groups, we assign $K_j$ groups to user j. Because the total number of sub-carrier groups assigned to a given user cannot be negative, we have $K_j \geq 0$. Also, the total number of sub-carrier groups assigned to all the users cannot exceed the available sub-carrier groups, K. That is, we have $$\sum_{j=}^{K_{User}} K_j \leq K.$$

As an example, for the choice of K=84 we can support up to 84 users, each using one group of 10 sub-carriers. On the other hand, we can also support 14 users each using 6 sub-carrier groups (or, a total of 6×10=60 sub-carriers per user).

After the sub-carriers groups are assigned to the individual users (according to their respective data rate requirements), each user performs the following:

The $N_K$ sub-carriers in a given group for a given user are partitioned into $M_T$ sub-groups in such a way that each sub-group contains $$N_{K,T} = \frac{N_K}{M_T}$$

sub-carriers. Note that for a given $M_T$, $N_K$ has to be selected in such a way that $M_T$ divides $N_K$ so that $N_{K,T}$ becomes an integer. As an example, with $M_T=2$ transmitter antennas, K=84 and $N_K=8$, we have $$N_{K,T} = \frac{8}{2} = 4.$$

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for encoding a symbol in a transmitter of a wireless network, wherein the network uses multiple-input and multiple-output (MIMO) orthogonal frequency division multiplexing (MIMO-OFDM), comprising the steps of:
   partitioning the sub-carriers to be used for transmitting the symbol into a set of K groups of contiguous sub-carriers, and for each group further comprising the steps:
   providing a set of $N_K-1$ modulation symbols $D_k(1)$, $D_k(2)$, ..., $D_k(N_k-1)$, wherein there is one modulation symbol for each sub-carrier in the group;
   mapping each modulation symbol $D_k(n)$, of group k, to a corresponding mapped modulation symbols $X_k(n)$ according to $$m(k) = \frac{1}{N_K - 1} \sum_{n=1}^{N_K-1} D_k(n)$$

$$X_k(n) = \alpha_1(k)(D_k(n) - m(k)) + \beta(k) \ n = 1, \ldots, N_K - 1$$

$$X_k(N_K) = \alpha_2(k)m(k),$$

where m(k) is a sample-mean of the set of modulation symbols of group k, $\alpha_1(k)$, $\alpha_2(k)$ and $\beta(k)$ are constants, wherein the constants are predetermined and positive.

2. The method of claim 1, wherein $E_S(k)$ is the average energy of each mapped modulation symbol for group k, and, for each of the K groups, the constants $\alpha_1(k)$, $\alpha_2(k)$ and $\beta(k)$ 211 are respectively selected according to the following functions as $$\alpha_1(k) = \sqrt{E_S(k)}$$

$$\alpha_2(k) = \sqrt{(N_K - 1)E_S(k)}, \text{ for } k = 1 \text{ to } K.$$

$$\beta(k) = \sqrt{\frac{E_S(k)}{N_K - 1}}$$

3. The method of claim 1, wherein a number of sub-carriers in each group is selected to be less than the channel coherence bandwidth.

4. The method of claim 1, further comprising:
   estimating a channel between the transmitter and a receiver based on a received signal corresponding to the symbol.

5. The method of claim 2, wherein a number of groups used is less than K, and the estimating uses frequency-domain interpolation process to estimate the channels in the unused sub-carriers.

6. The method of claim 1, further comprising:
   estimating an average noise power per channel for each group.

7. The method of claim 1, further comprising:
   estimating an average effective signal-to-noise ratio and error rate for the K groups, and further comprising:
   selecting a modulation order and channel code rate to transmit the symbol.

8. The method of claim 1, wherein the transmitter includes $M_T$ antennas, and further comprising:
   partitioning each sub-group into $M_T$ sub-groups; and
   performing the providing and mapping for each sub-group.

9. The method of claim 7, further comprising:
   estimation of a per-stream signal-to-interference-plus-noise ratio for a linear zero-forcing receiver with multiple spatial data streams; and
   selecting, for each spatial data stream, a modulation order and a channel code to transmit the spatial data stream.

10. The method of claim 7, further comprising:
    estimation of a per-stream signal-to-interference-plus-noise ratio for a linear minimum-mean-square error receiver with multiple spatial data streams; and
    selecting, for each spatial data stream, a modulation order and a channel code to transmit the spatial data stream.

11. The method of claim 7, further comprising:
    estimation of a per-stream signal-to-interference-plus-noise ratio for a non-linear maximum-likelihood receiver; and
    selecting, for each spatial data stream, a modulation order and a channel code to transmit the spatial data stream.

12. The method of claim 7, wherein a number of users is $K_{User}$, and a number of transmitter antennas per-user is $M_T$, further comprising:
    partitioning an available number of sub-carriers $N_U$, into K contiguous groups, wherein each contiguous group includes of $$N_K = \frac{N_U}{K}$$

sub-carriers;
    assigning $K_j$, groups to user j from the K contiguous sub-carrier groups, while satisfying a constraint $$\sum_{j=}^{K_{User}} K_j \leq K;$$

and
    performing the providing and the mapping for each contiguous sub-group for each user j.

* * * * *